(12) United States Patent
Zhou et al.

(10) Patent No.: US 11,739,849 B2
(45) Date of Patent: Aug. 29, 2023

(54) ANGLE VALVE STRUCTURE

(71) Applicant: ZHONGSHAN MEITU PLASTIC IND. CO., LTD., Zhongshan (CN)

(72) Inventors: Wenhui Zhou, Zhongshan (CN); Hai Zhang, Zhongshan (CN); Haojia Huang, Zhongshan (CN); Qian Shen, Zhongshan (CN); Ke Xiao, Zhongshan (CN)

(73) Assignee: ZHONGSHAN MEITU PLASTIC IND. CO., LTD., Zhongshan (CN)

( * ) Notice: Subject to any disclaimer, the term of this patent is extended or adjusted under 35 U.S.C. 154(b) by 32 days.

(21) Appl. No.: 17/678,097

(22) Filed: Feb. 23, 2022

(65) Prior Publication Data
US 2023/0175596 A1    Jun. 8, 2023

(30) Foreign Application Priority Data

Dec. 3, 2021 (CN) .......................... 202123028443.6
Dec. 3, 2021 (CN) .......................... 202123040099.2

(51) Int. Cl.
*F16K 5/04* (2006.01)
*F16K 5/18* (2006.01)

(52) U.S. Cl.
CPC ............ *F16K 5/0407* (2013.01); *F16K 5/184* (2013.01)

(58) Field of Classification Search
CPC . F16K 3/24; F16K 3/22; F16K 5/0407; F16K 5/184; F16K 5/0414; F16K 5/14; F16K 5/18; E03C 2001/026; E03C 1/0408
See application file for complete search history.

(56) References Cited

U.S. PATENT DOCUMENTS 4,958,802 A * 9/1990 Underwood .......... F16K 27/065
                                                              251/310
2016/0340876 A1* 11/2016 Lin ........................ E03C 1/0408

FOREIGN PATENT DOCUMENTS

| FR | 2233540 A1 | 1/1975 |
| GB | 1504139 A | 3/1978 |
| GB | 2168127 A | 6/1986 |
| KR | 20110004873 U | 5/2011 |

* cited by examiner

*Primary Examiner* — Kelsey E Cary
(74) *Attorney, Agent, or Firm* — Bayramoglu Law Offices LLC

(57) ABSTRACT

An angle valve structure includes an angle valve body. The angle valve body is provided with a water inlet channel, a water outlet channel and an accommodation cavity. The accommodation cavity is rotationally provided with a valve core. One end of the valve core exposed outside the accommodation cavity is fixedly connected with a knob. The valve core is provided with a sealing block for sealing the water outlet channel when sealing. The valve core includes a main body part and an elastic arm whose one end is connected with the main body part. One side of the main body part is provided with a mounting slot for placing the sealing block, one side of the elastic arm is provided with an extrusion portion, and the other side of the elastic arm is provided with a contact portion against the sealing block after assembly.

15 Claims, 17 Drawing Sheets

ANGLE VALVE STRUCTURE

CROSS REFERENCE TO THE RELATED APPLICATIONS

This application is based upon and claims priority to Chinese Patent Applications No. 202123040099.2 and No. 202123028443.6, both filed on Dec. 3, 2021, and the entire contents of which are incorporated herein by reference.

TECHNICAL FIELD

The disclosure relates to the technical field of valves, in particular to an angle valve structure.

BACKGROUND

In the prior art, the angle valve usually adopts a spherical valve core, a through hole is arranged on the spherical valve core, and the spherical valve core is driven to rotate through the knob, so that the through hole is communicated with the water outlet channel and the water inlet channel. However, after long-term use, there is wear between the spherical valve core and the angle valve body, the sealing between the spherical valve core and the angle valve body is insufficient, which is easy to cause water leakage, etc.

Therefore, the existing technology can not meet the current demand.

SUMMARY

In order to solve the above problems, the present disclosure provides an angle valve structure with good sealing effect.

In order to achieve the above objective, the present disclosure provides the following technical solution:

An angle valve structure, including an angle valve body, an water inlet channel and an water outlet channel are arranged in the angle valve body, an accommodation cavity respectively communicated with the water inlet channel and the water outlet channel is arranged between the water inlet channel and the water outlet channel, and a valve core is rotatably arranged in the accommodation cavity, a knob is fixedly connected to one end of the valve core exposed outside the accommodation cavity, wherein the valve core is provided with a sealing block for sealing the water outlet channel; the valve core includes a main body part and an elastic arm whose one end is connected with the main body part, one side of the main body part is provided with a mounting slot for placing the sealing block, one side of the elastic arm is provided with an extrusion portion, and the other side of the elastic arm is provided with a contact portion extending into the mounting slot and butting against the sealing block after assembly; when the angle valve is closed, the extrusion portion butts against an inner wall of the accommodation cavity, so that the contact portion butts the sealing block against the water outlet channel under an action of the inner wall of the accommodation cavity to complete sealing; when the angle valve is opened, the extrusion portion butts against the inner wall of the accommodation cavity, so that the contact portion butts the sealing block against the inner wall of the accommodation cavity.

As a further improvement, an accommodation slot is arranged on the other side of the main body part, and an opening slot is arranged on a bottom wall of the mounting slot, so that the accommodation slot is communicated with the mounting slot through the opening slot, one end of the elastic arm is fixedly connected with a bottom wall of the accommodation slot; the contact portion is inserted into the opening slot and butts against the sealing block after assembly.

As a further improvement, the extrusion portion is provided with a wear-resistant block, so that after assembly, the extrusion portion butts against the inner wall of the accommodation cavity through the wear-resistant block.

As a further improvement, one end of the main body part is provided with a first rotating part, and the other end of the main body part is provided with a second rotating part; a water flow channel for water flowing is provided between the first rotating part, the second rotating part, the main body part and the inner wall of the accommodation cavity after assembly.

As a further improvement, one end of the angle valve body is provided with a first opening communicated with the accommodation cavity, and one end of the first rotating part away from the main body part is provided with a first connecting part, the first connecting part is inserted into the first opening and partially exposed outside the angle valve body, and the knob is fixedly connected with the first connecting part in a circumferential direction.

As a further improvement, the first rotating part is provided with a first sealing groove, the first sealing groove is provided with a first sealing ring, and one end of the first sealing ring is against a bottom wall of the first sealing groove after assembly, the other end of the first sealing ring is against the inner wall of the accommodation cavity.

As a further improvement, the knob is provided with a connecting through hole, the first connecting part is provided with a first threaded hole, and the knob is fixedly connected with the first connecting part through a fixing screw, the fixing screw is threaded with the first threaded hole after passing through the connecting through hole.

As a further improvement, a limit column is provided and raised from an outer peripheral surface of the first connecting part, an inner wall of the first opening extends inward to form an arc groove, and the arc groove is provided with a closed limit step and an open limit step; the limit column is movably arranged in the arc groove after assembly; when the limit column butts against the closed limit step, the sealing block butts against the water outlet channel to complete the sealing; when the limit column butts against the open limit step, the sealing block is moved away from the water outlet channel.

As a further improvement, the angle valve body is provided with a water inlet joint, the water inlet joint is detachably connected with the angle valve body through the joint piece, and the water inlet joint is provided with a joint insertion part inserted into the water inlet channel during assembly, the joint insertion part is provided with an insertion slot; the peripheral surface of the angle valve body is provided with an insertion hole communicated with the water inlet channel, the joint piece is provided with a snap arm, and a joint mounting cavity with an opening at one end is formed between the two snap arms; a side wall of the snap arm located towards the joint mounting cavity is provided with an insertion piece raised from the side wall and the insertion piece is matched with the insertion slot; the peripheral surface of the snap arm away from the joint mounting cavity is provided with a snap block, and the peripheral surface of the angle valve body is provided with a boss; a snap arm insertion cavity communicated with the insertion hole is arranged in the boss; the snap arm is inserted into the snap arm insertion cavity during assembly, the insertion piece is inserted into the insertion slot after passing through the insertion hole, and the snap block is against one end surface of the boss.

As a further improvement, a limit block is arranged on a peripheral surface of the snap arm away from the joint mounting cavity, and one end of the limit block is provided with a snap arm limit step, the other end of the limit block is provided with a first sliding guide inclined surface inclined towards a direction of the snap block.

As a further improvement, the insertion piece is provided with an avoidance slot located on an inner side of the snap arm and corresponding to the snap block, so that when the joint piece is inserted or pulled out, a section of the snap arm at the snap block is deformed and enters the avoidance slot.

As a further improvement, one end of the insertion piece towards the limit block is provided with a second sliding guide inclined surface inclined in a direction away from the limit block.

As a further improvement, a joint sealing groove is arranged on the peripheral surface of the water inlet joint, a joint sealing ring is arranged in the joint sealing groove, and one end of the joint sealing ring butts against a bottom wall of the joint sealing groove after assembly, the other end of the joint sealing ring is against the inner wall of the water inlet channel.

As a further improvement, a locating ring is formed on the outer peripheral surface of the water inlet joint, and a raised positioning insertion key is arranged on an end surface of one end of the locating ring towards the insertion slot, the angle valve body is provided with a positioning slot matched with the positioning insertion key, and the positioning slot is arranged on an end surface between the two bosses.

As a further improvement, the water inlet joint is provided with a joint connection part, and the locating ring is arranged between the joint insertion part and the joint connection part.

The advantageous effects of the present disclosure are as following:

1. After the assembly of the present disclosure, the elastic arm is moved towards one side of the sealing block under the action of the inner wall of the accommodation cavity or under the action of water, so that the contact portion or water butts the sealing block against the water outlet channel to complete the sealing, and uses the pressure of water and the force of the contact portion to strengthen the sealing effect and effectively prevent water leakage;

2. The angle valve body of the present disclosure is connected with the water inlet joint by inserting a joint piece on the outer circumference. When connected, the snap block butts against one end surface of the boss so that the insertion piece is inserted in the insertion slot, so that the water inlet joint and the angle valve body remain sealed and connected. When disconnected, the handle on the joint piece is pulled to deform a section of the snap arm at the snap block into the avoidance slot, so as to separate the boss from the snap block. Therefore, the insertion piece is also separated from the insertion slot, and the water inlet joint can be pulled out from the angle valve body to complete the disassemble. By using the snap block to cooperate with the boss to maintain the snap-fit connection, the angle valve structure has good overall use effect, strong durability and applicability, and the angle valve structure also has simple structure, which has advantages in convenient manufacture, low cost and good user experience performance.

DETAILED DESCRIPTION OF THE EMBODIMENTS

Figure 1:
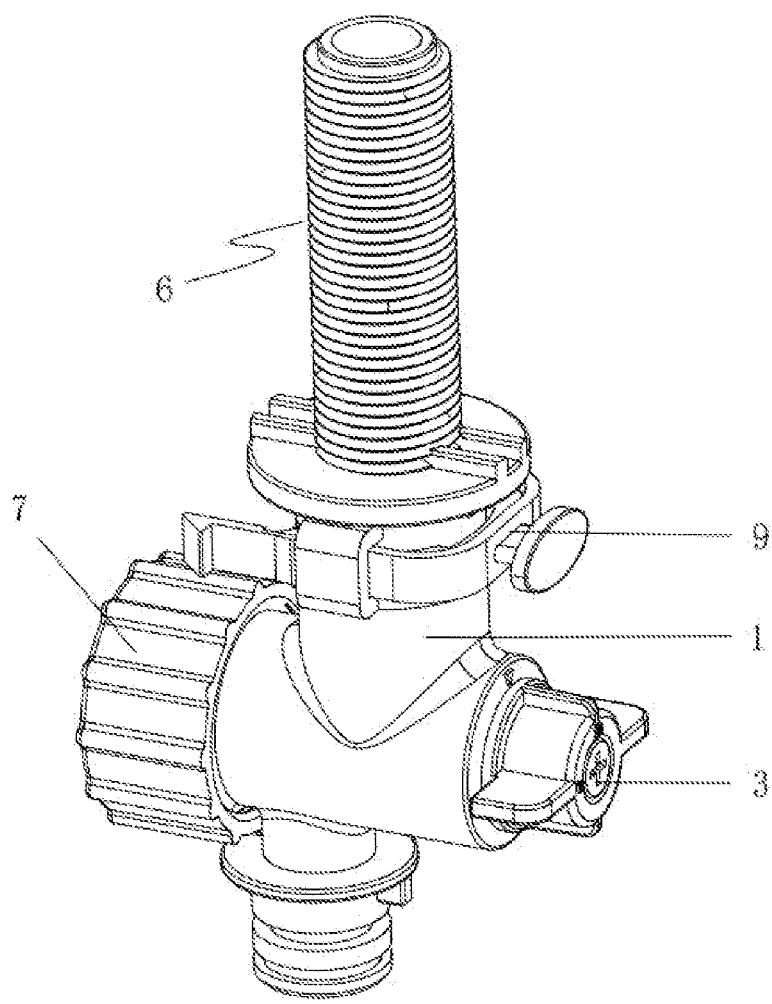
FIG. 1 is the first structural diagram of the present disclosure.
Figure 2:
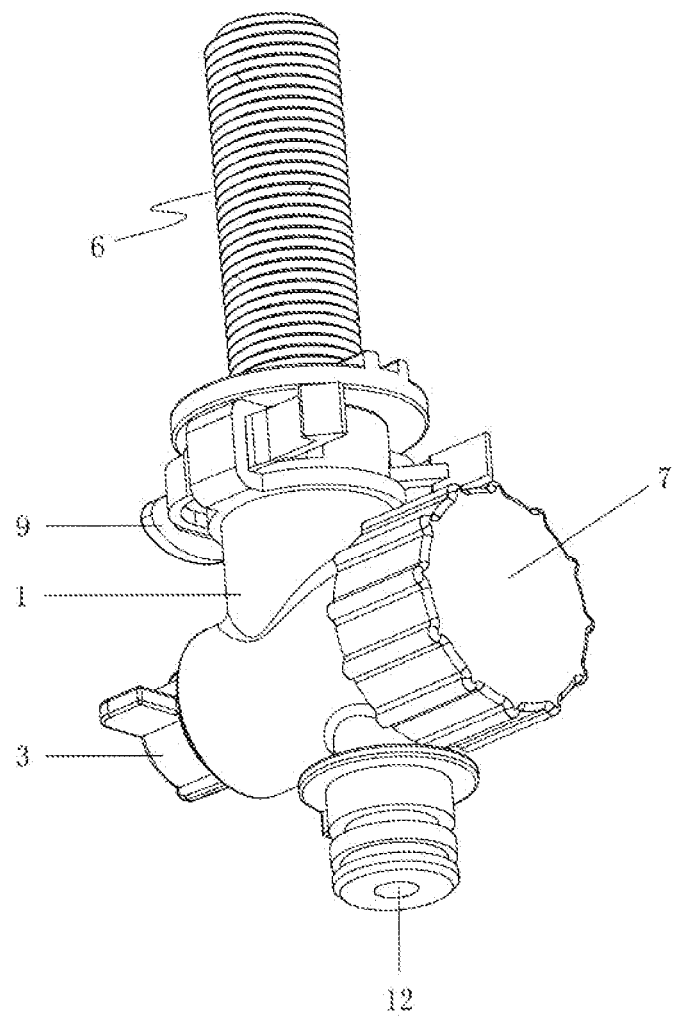
FIG. 2 is the second structural diagram of the present disclosure.
Figure 3:
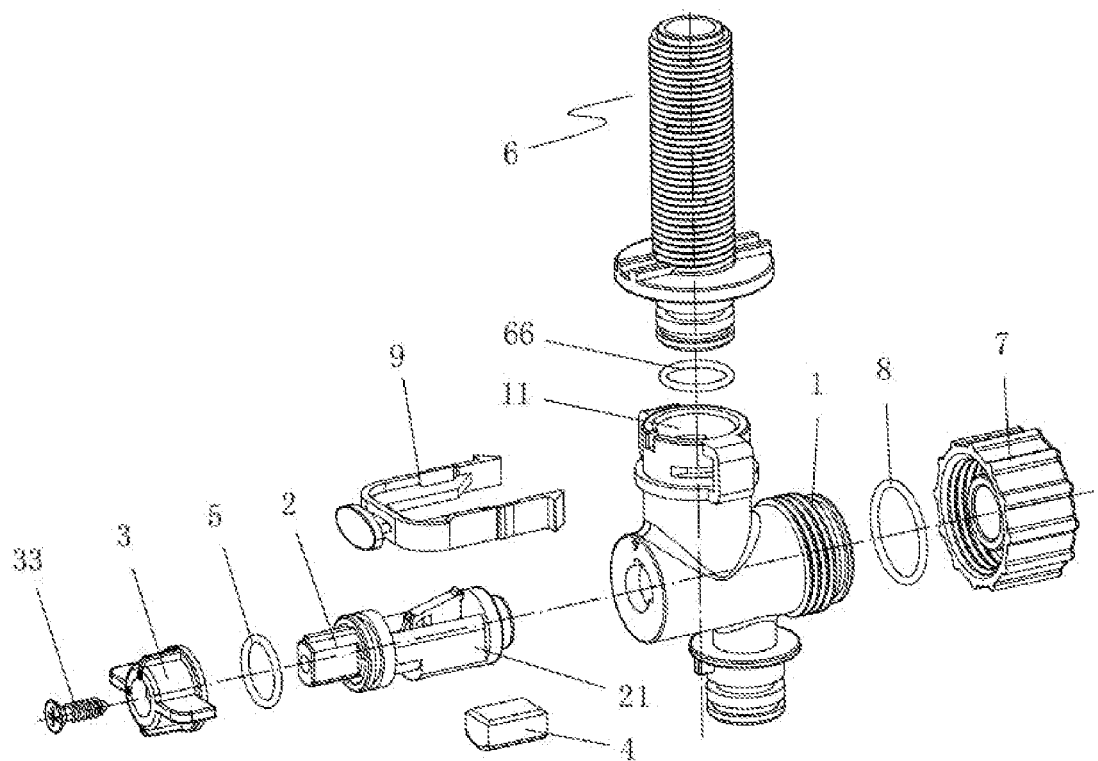
FIG. 3 is an exploded view of the present disclosure.
Figure 4:
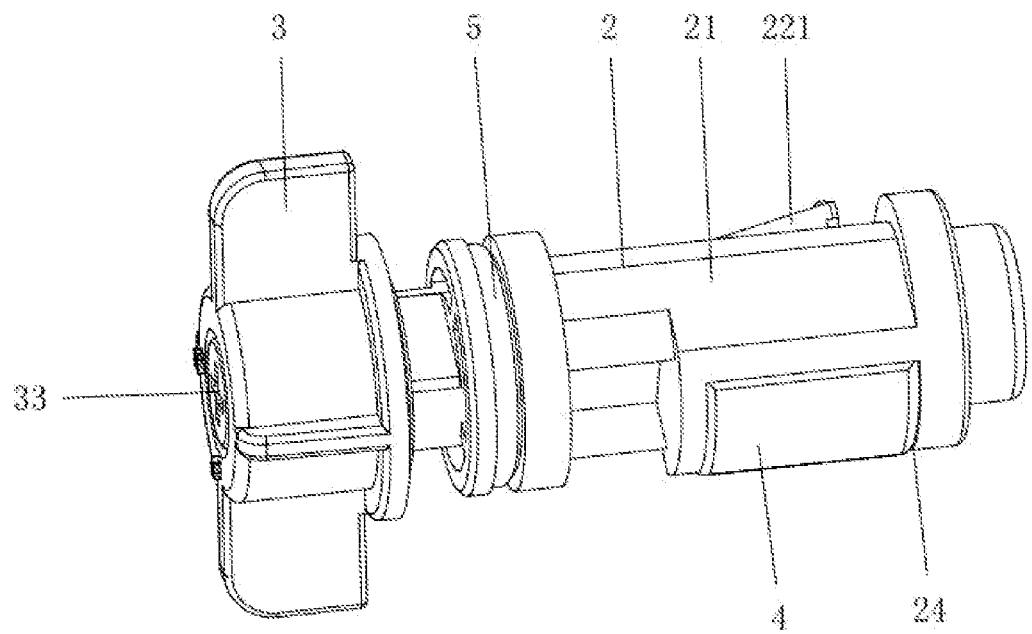
FIG. 4 is a structural diagram of the present disclosure after the angle valve body, the sealing cover and the water inlet joint are removed.
Figure 5:
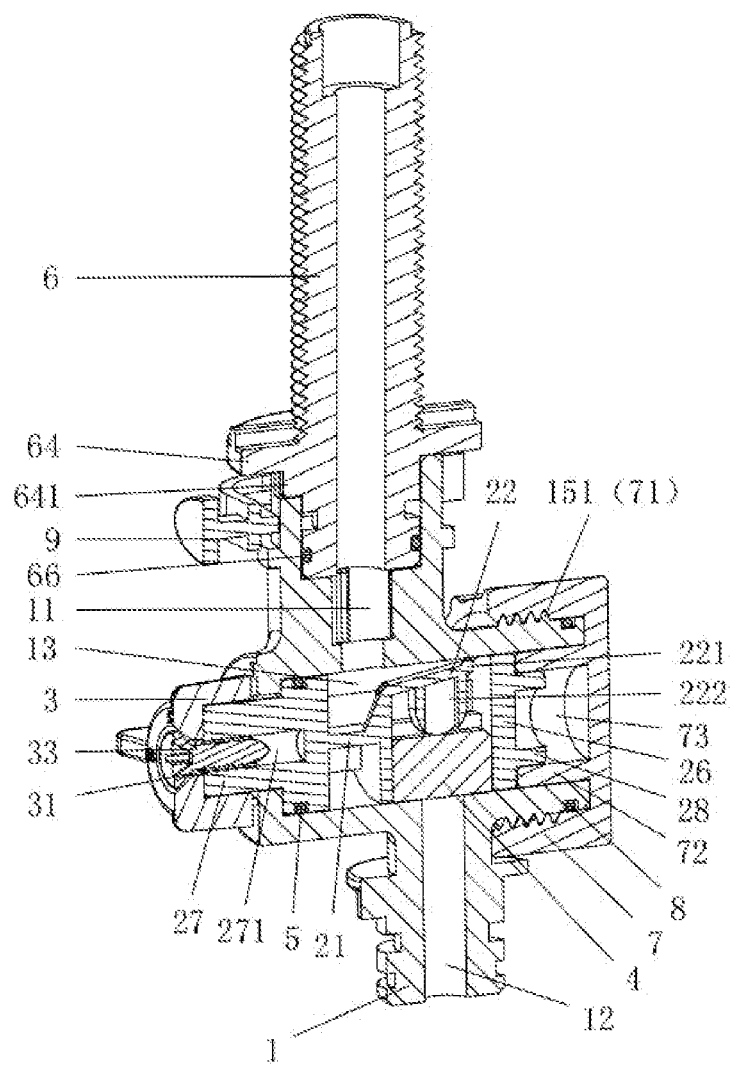
FIG. 5 is a sectional view of the valve core of the present disclosure in a closed state.
Figure 6:
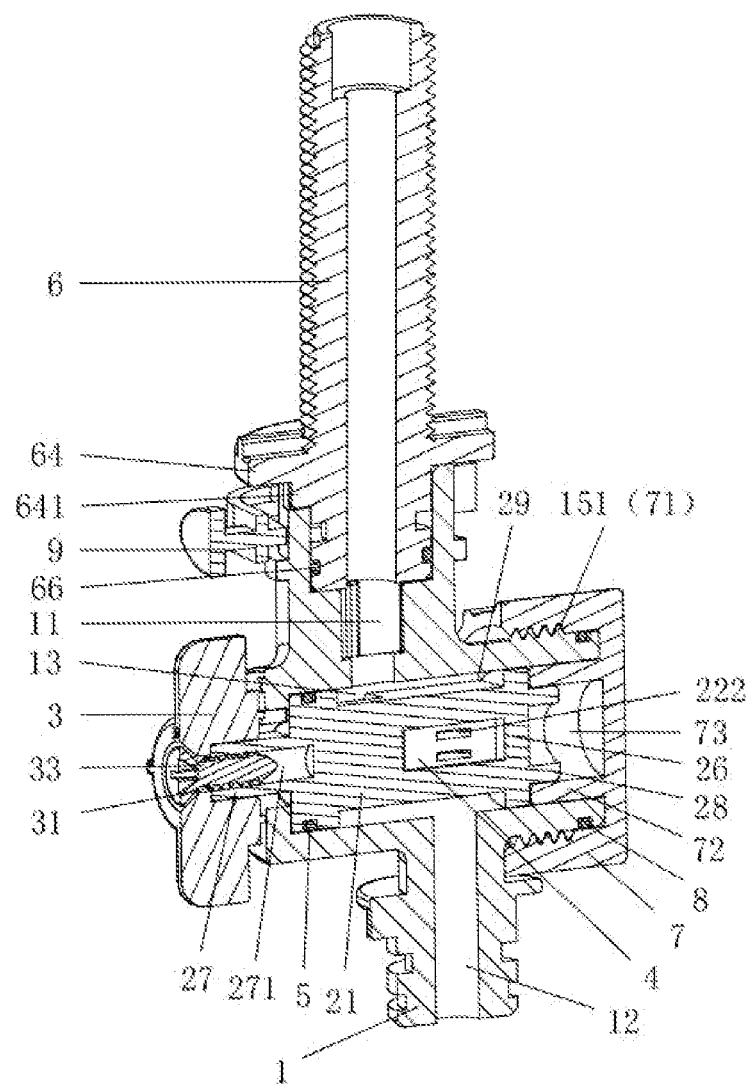
FIG. 6 is a sectional view of the valve core of the present disclosure in an open state.
Figure 7:
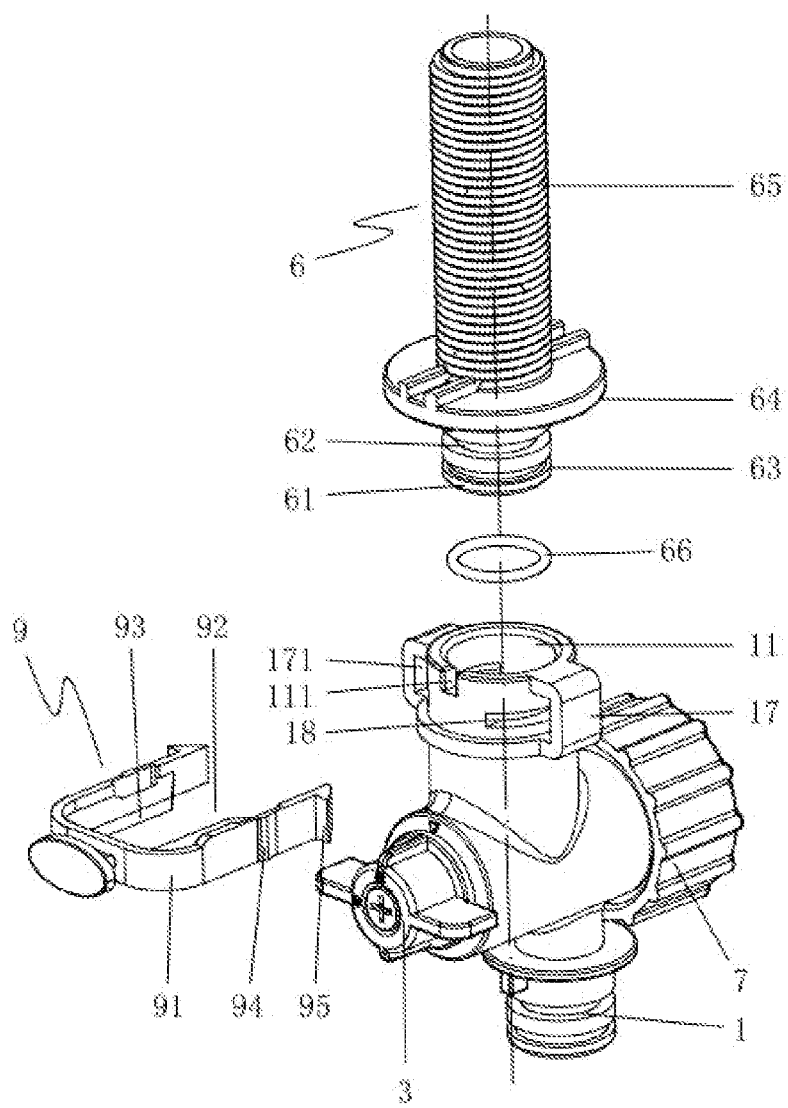
FIG. 7 is a partial exploded view of the present disclosure.
Figure 8:
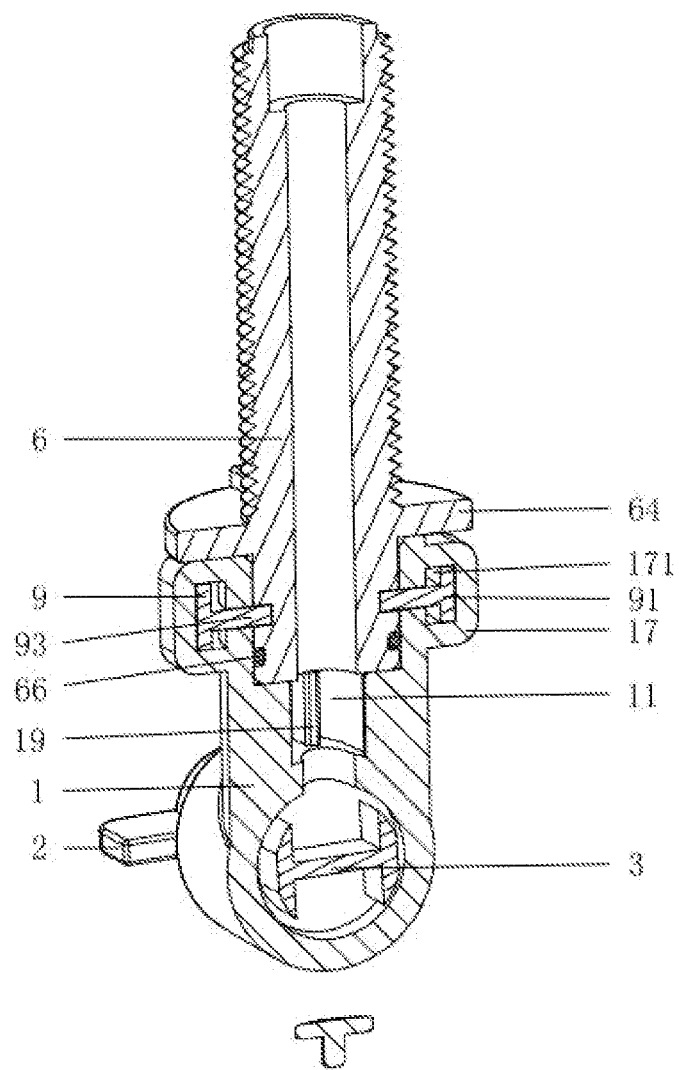
FIG. 8 is a sectional view of the angle valve body and the water inlet joint in connection state.
Figure 9:
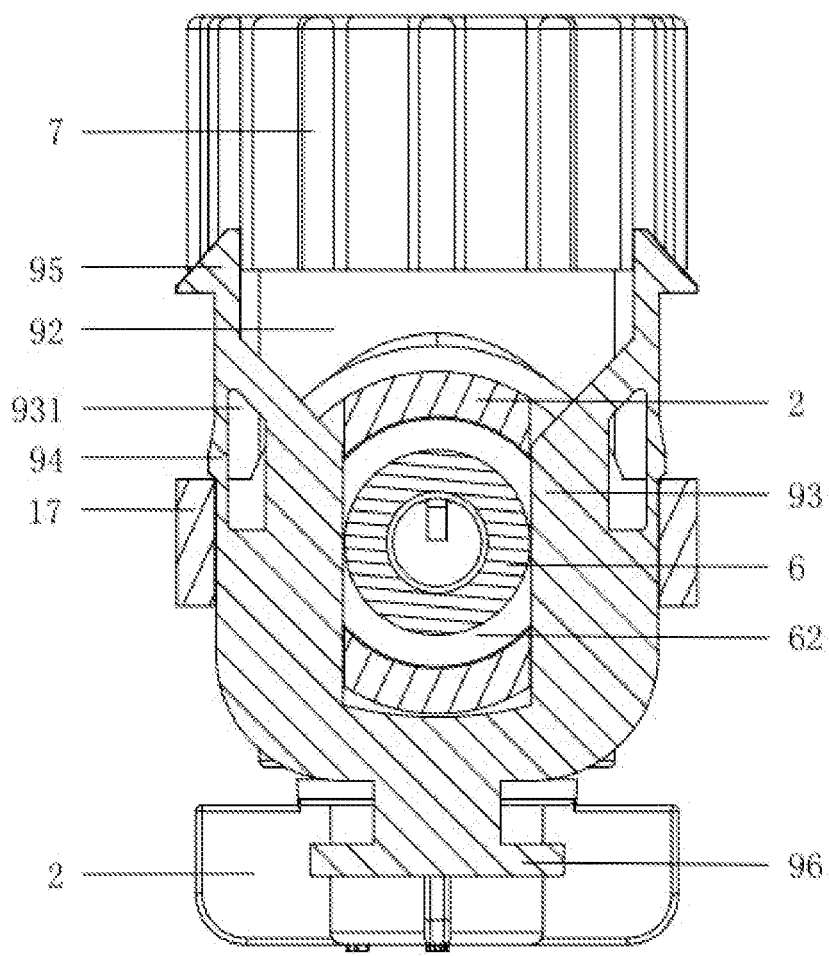
FIG. 9 is a longitudinal sectional view of the angle valve body and the water inlet joint in connection state.
Figure 10:
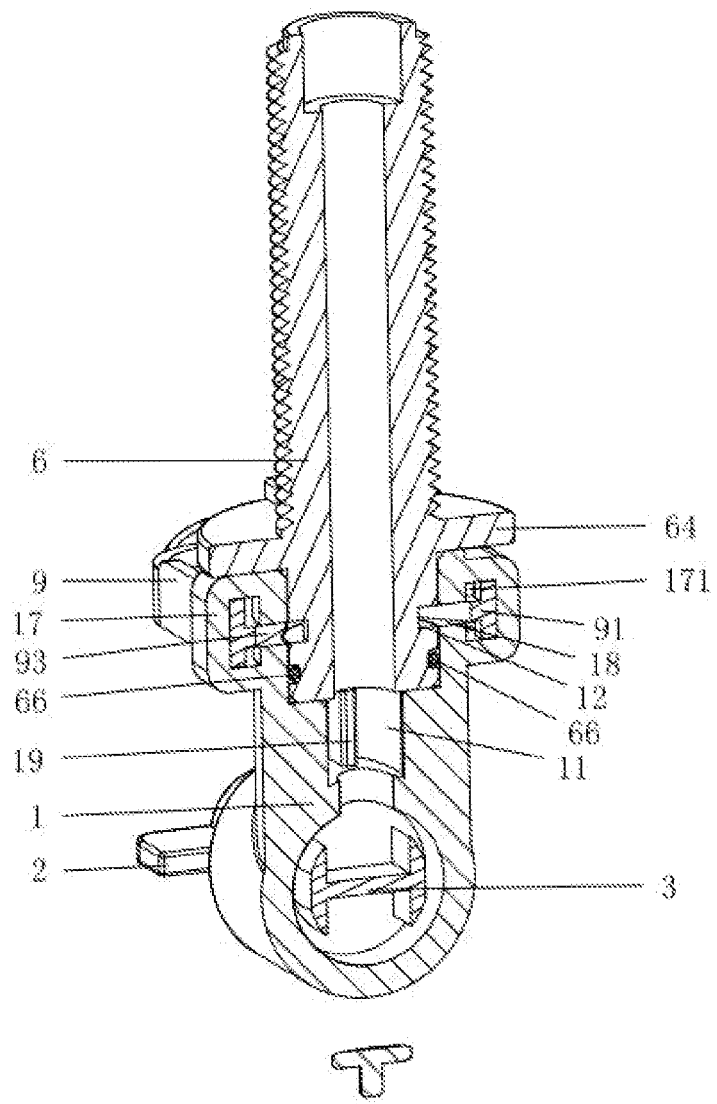
FIG. 10 is a transverse sectional view of the angle valve body and the water inlet joint in disconnection state.
Figure 11:
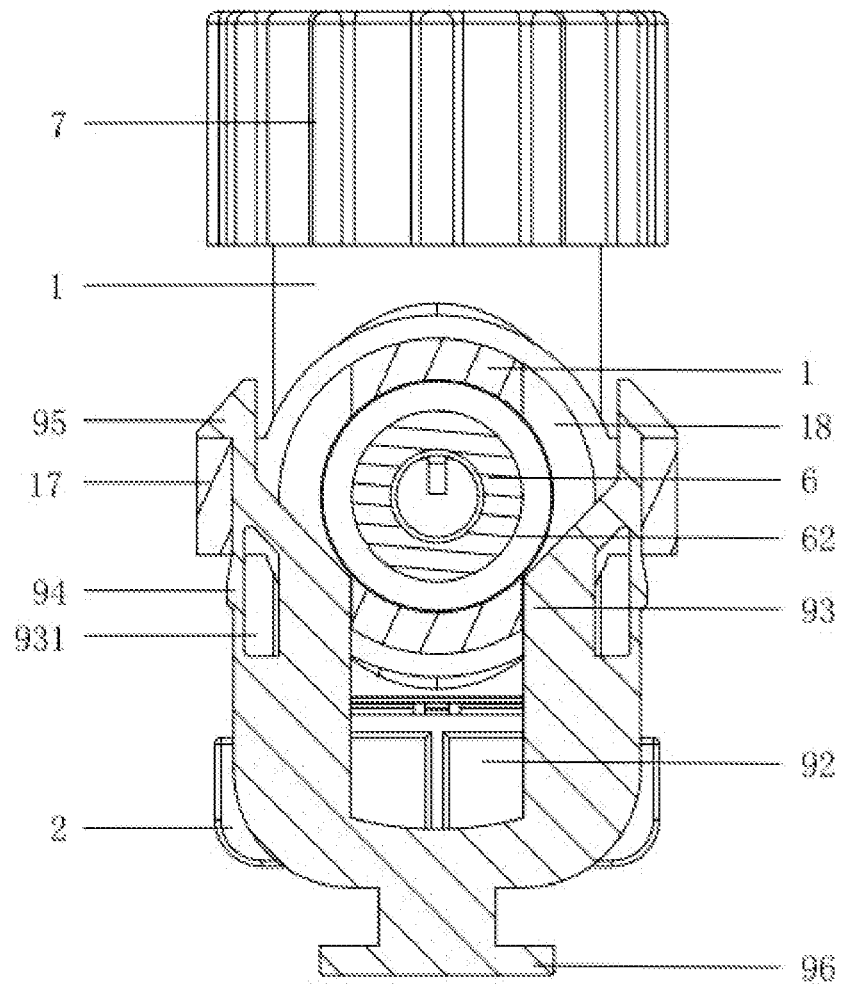
FIG. 11 is a longitudinal sectional view of the angle valve body and the water inlet joint in disconnection state.
Figure 12:
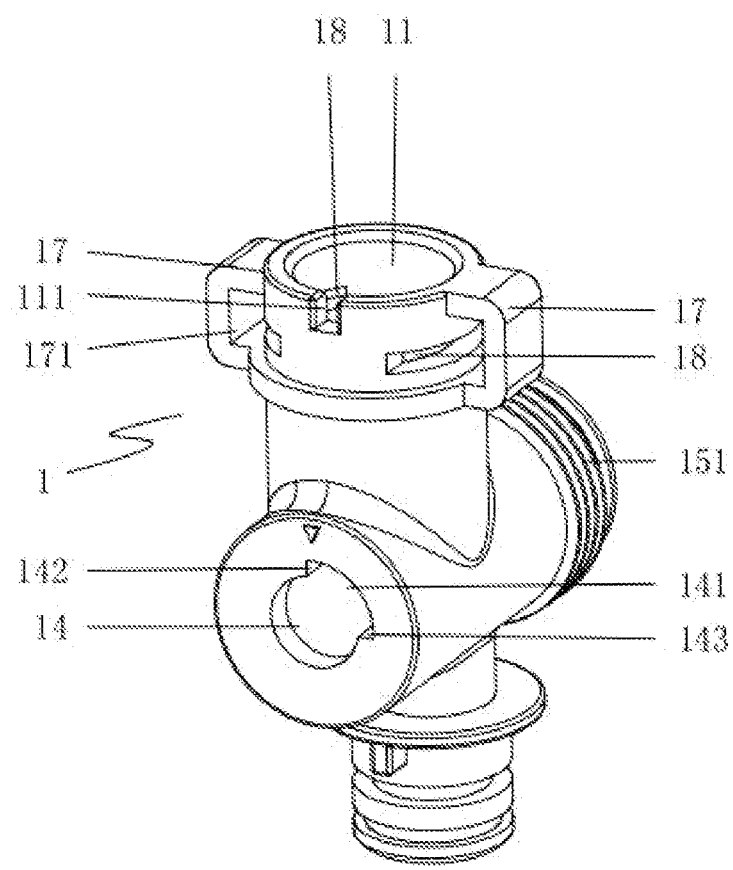
FIG. 12 is the first structural diagram of the angle valve body.
Figure 13:
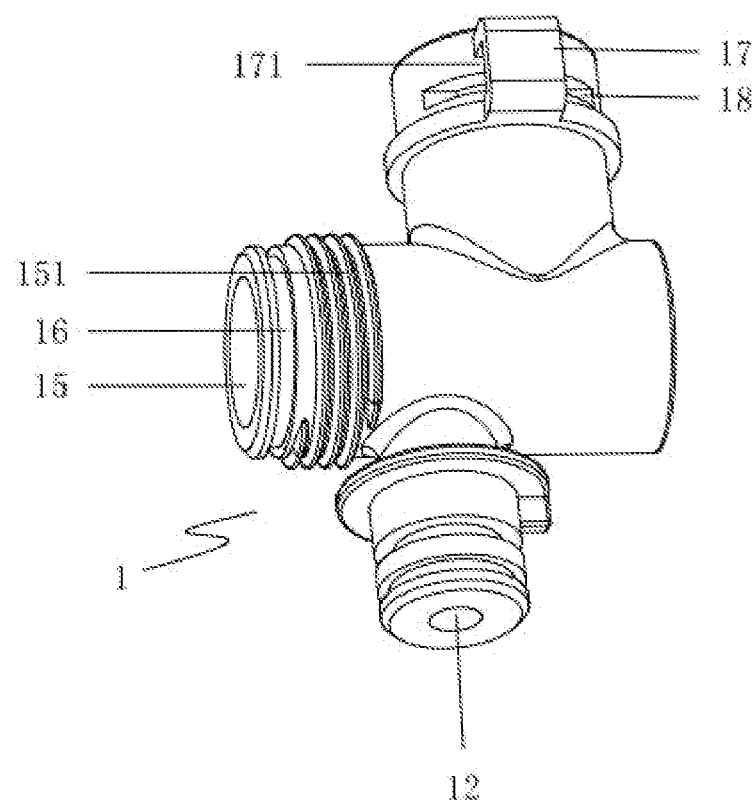
FIG. 13 is the second structural diagram of the angle valve body.
Figure 14:
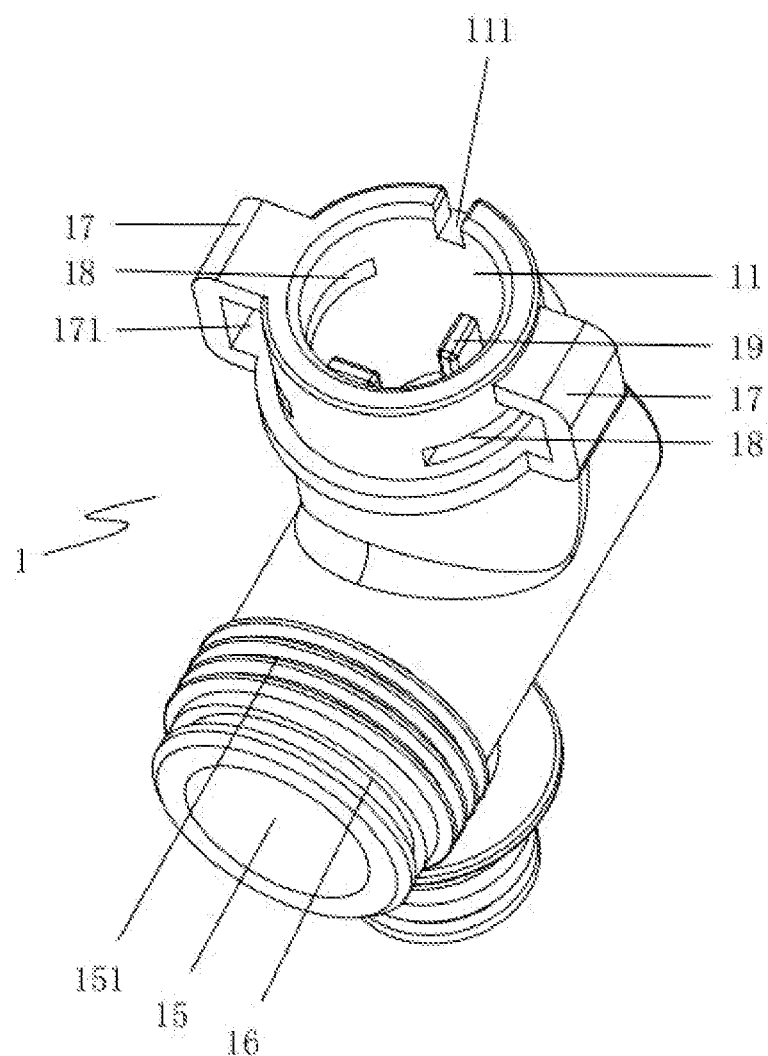
FIG. 14 is the third structural diagram of the angle valve body.
Figure 15:
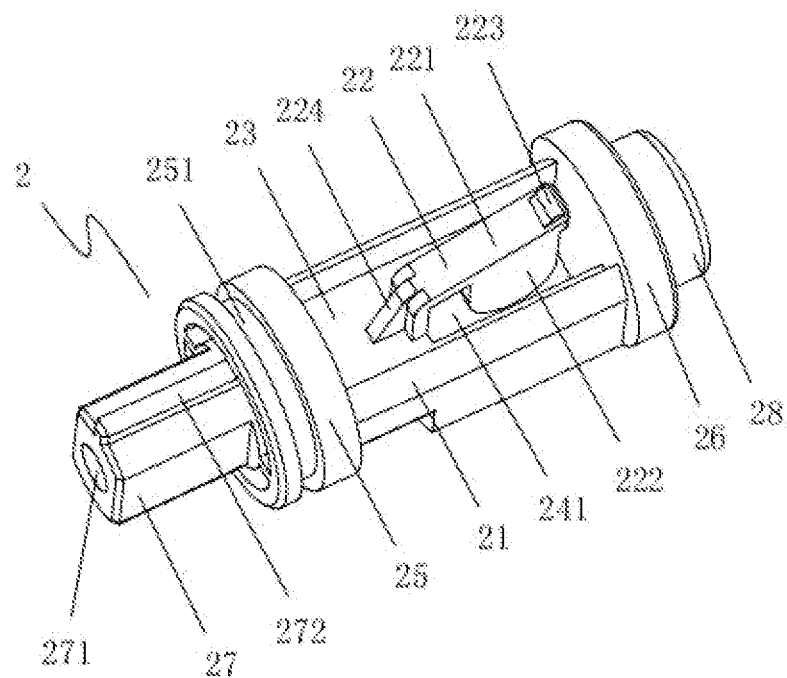
FIG. 15 is the first structural diagram of the valve core.
Figure 16:
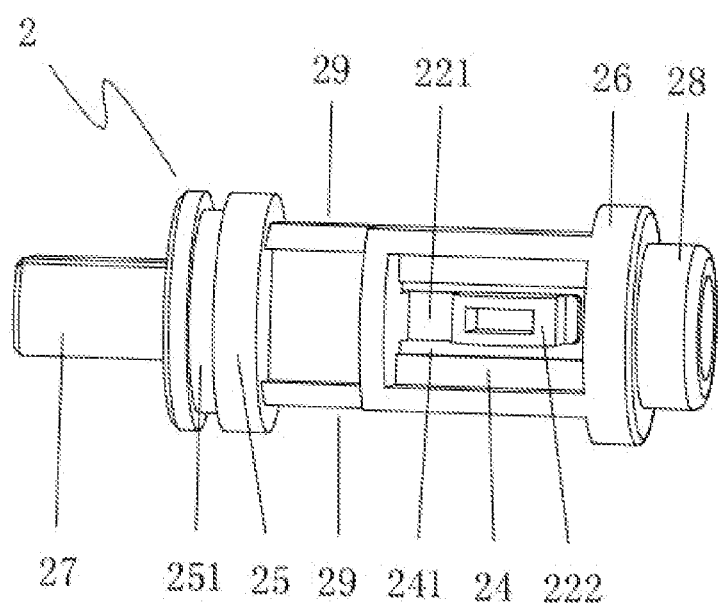
FIG. 16 is the second structural diagram of the valve core.
Figure 17:
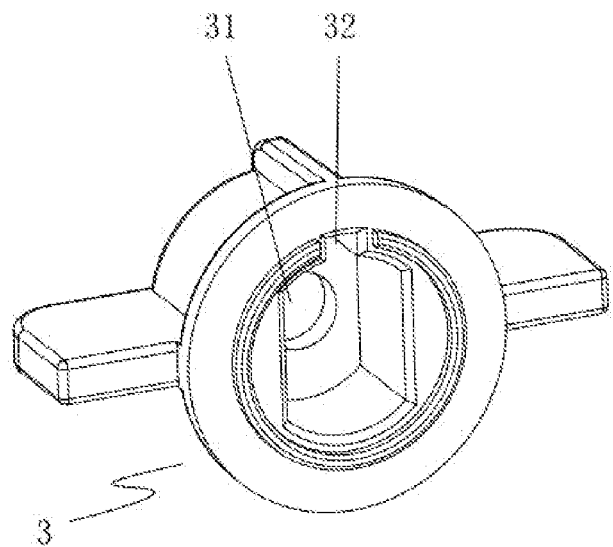
FIG. 17 is a structural diagram of a knob.
Figure 18:
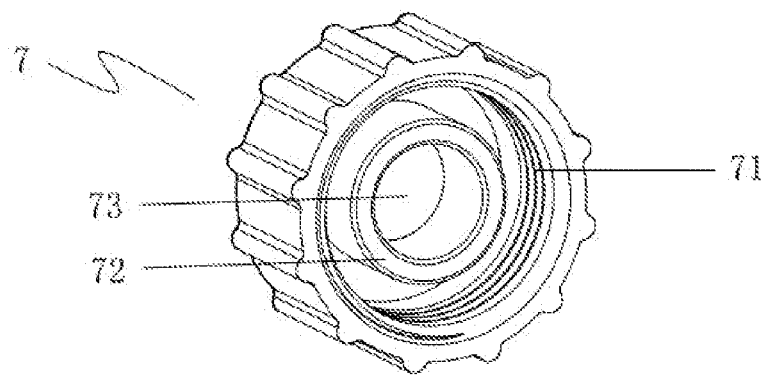
FIG. 18 is a structural diagram of the sealing cover.
Figure 19:
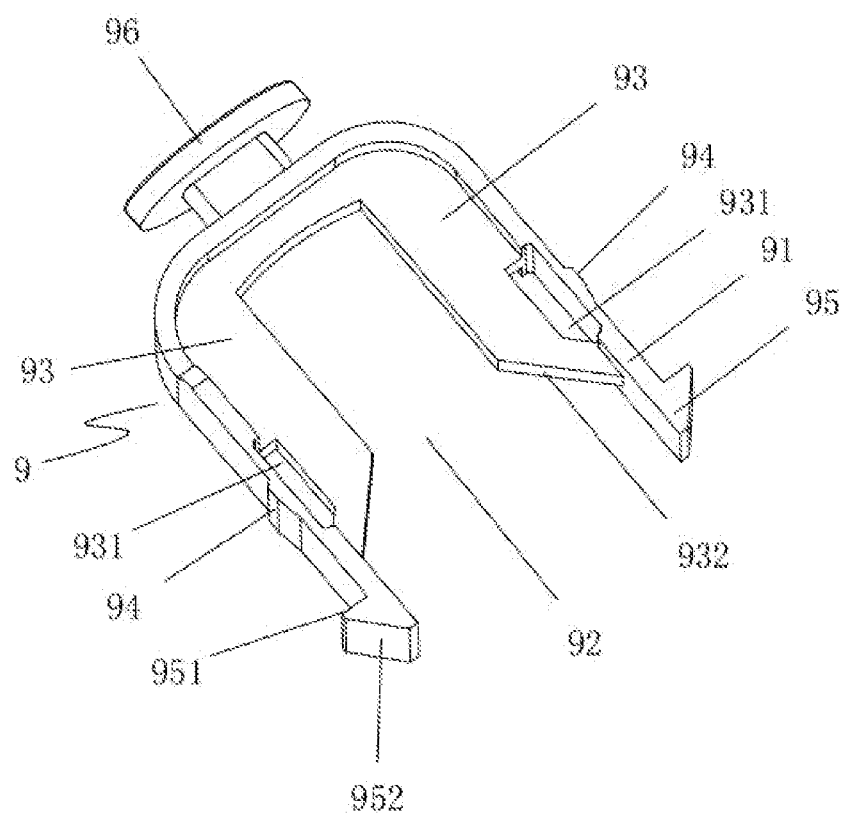
FIG. 19 is a structural diagram of a joint piece.
Figure 20:
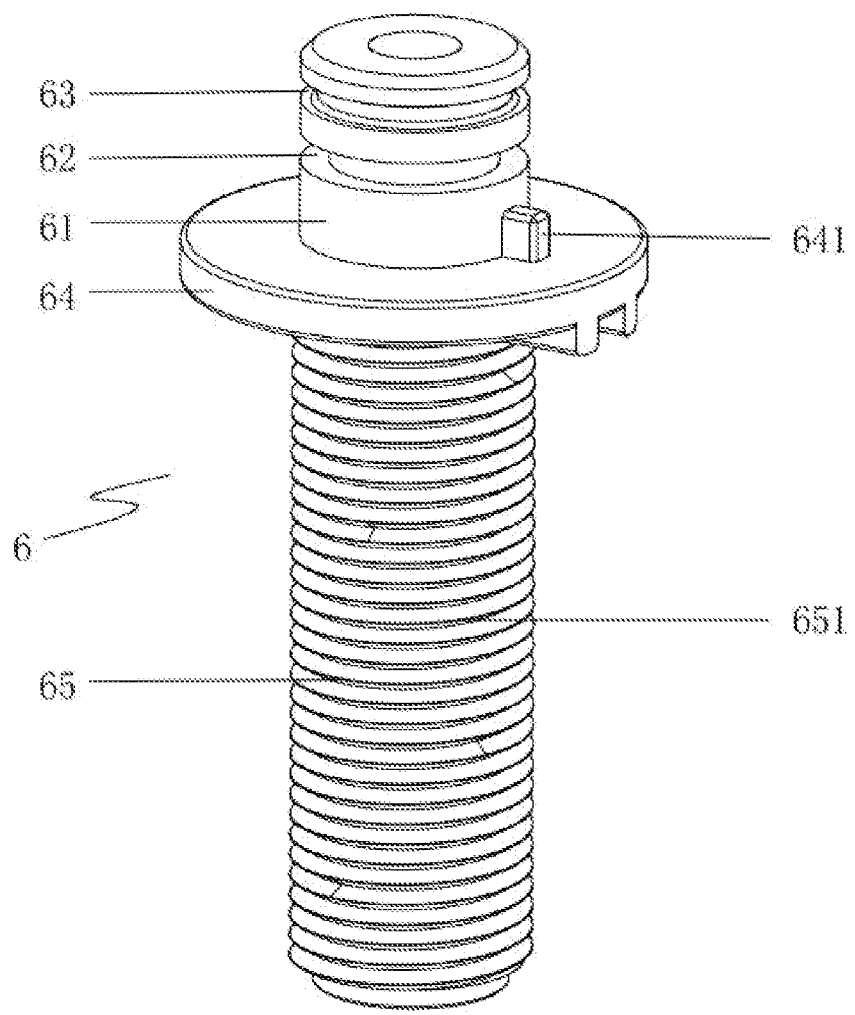
FIG. 20 is a structural diagram of the water inlet joint.

The present disclosure is further described in detail below in combination with the accompanying drawings and specific embodiments:

As shown in FIG. 1-FIG. 20, an angle valve structure includes a angle valve body 1. A water inlet channel 11 and a water outlet channel 12 are arranged in the angle valve body 1. Between the water inlet channel 11 and the water outlet channel 12, an accommodation cavity 13 communicated with the water inlet channel 11 and the water outlet channel 12 respectively is also arranged. A valve core 2 is rotatably arranged in the accommodation cavity 13, a knob 3 is fixedly connected to one end of the valve core 2 exposed outside the accommodation cavity 13, and a sealing block 4 for sealing the water outlet channel 12 when sealing is arranged on the valve core 2. The valve core 2 includes a main body part 21 and an elastic arm 22 connected with the main body part 21 at one end, and a mounting groove 24 for placing the sealing block 4 is arranged on one side of the main body part 21. One side of the elastic arm 22 is provided with an extrusion portion 221, and the other side of the elastic arm 22 is provided with a contact portion 222 which extends into the mounting groove 24 and butts against the sealing block 4 after assembly. When the angle valve is closed, the extrusion portion 221 butts against the inner wall of the accommodation cavity 13, so that under the action of the inner wall of the accommodation cavity 13, the contact portion 222 butts the sealing block 4 against the water outlet channel 12 to complete the sealing. When the angle valve is opened, the extrusion portion 221 butts against the inner wall of the accommodation cavity 13, so that the contact portion 222 butts the sealing block 4 against the inner wall of the accommodation cavity 13. The other side of the main body part 21 is provided with an accommodation slot 23, the bottom wall of the mounting slot 24 is provided with an opening slot 241, so that the accommodation slot 23 is communicated with the mounting slot 24 through the opening slot 241. One end of the elastic arm 22 is fixedly connected with the bottom wall of the accommodation slot 23, and the contact portion 222 is inserted in the opening slot 241 and butts against the sealing block 4 after assembly. The extrusion portion 221 is provided with a wear-resistant block 223, so that the extrusion portion 221 butts against the inner wall of the accommodation cavity 13 through the wear-resistant block 223 after assembly. One end of the elastic arm 22 is also provided with a reinforcing rib 224. After assembly, the elastic arm 22 swings towards one side of the sealing block 4 under the action of the inner wall of the accommodation cavity 13 or under the action of water, so that the contact portion 222 or water butts the sealing block 4 against the water outlet channel 12 to complete the sealing. By using the pressure of water and the force of the contact portion 222, the sealing effect is strengthen, so as to effectively prevent water leakage. When in use, only the wear-resistant block 223 is in contact with the inner wall of the accommodation cavity 13, so that after long-term use of the angle valve, only the wear-resistant block 223 of the valve core 2 is worn. At the same time, the wear of the wear-resistant block 223 will not reduce the sealing performance of the sealing block 4, the wear-resistant block 223 is still against the inner wall of the accommodation cavity 13, and the contact portion 222 will still press the sealing block 4 against the water outlet channel 12, so as to maintain the sealing connection and effectively prevent water leakage.

As shown in FIG. 4-FIG. 6 and FIG. 15-FIG. 16, in this embodiment, one end of the main body part 21 is provided with a first rotating part 25, the other end of the main body part 21 is provided with a second rotating part 26. After assembly, a water flow channel 29 for water flow is arranged between the first rotating part 25, the second rotating part 26, the main body part 21 and the inner wall of the accommodation cavity 13. When the knob 3 is rotated, so that the valve core 2 drives the sealing block 4 to move and no longer butts against the water outlet channel 12, water can enter the accommodation cavity 13 from the water inlet channel 11 and flow into the water outlet channel 12 through the water flow channel 29. At the same time, the knob 3 can be rotated to control the area occupied by the sealing block 4 on the water outlet channel 12, so that the flow of water flow can be regulated, and the structure is simple and easy to disassemble.

As shown in FIG. 5-FIG. 6 and FIG. 12-FIG. 14, in the present embodiment, one end of the angle valve body 1 is provided with a first opening 14 communicated with the accommodation cavity 13. One end of the first rotating part 25 away from the main body part 21 is provided with a first connecting part 27, and the first connecting part 27 is inserted into the first opening 14 and partially exposed outside the angle valve body 1. The knob 3 is fixedly connected with the first connecting part 27 in a circumferential direction. A first sealing groove 251 is provided with the first rotating part 25, and a first sealing ring 5 is arranged in the first sealing groove 251. After assembly, one end of the first sealing ring 5 butts against the bottom wall of the first sealing groove 251, and the other end of the first sealing ring 5 butts against the inner wall of the accommodation cavity 13. The knob 3 is provided with a connecting through hole 31, the first connecting part 27 is provided with a first threaded hole 271, the knob 3 is fixedly connected with the first connecting part 27 through a fixing screw 33, and the fixing screw 33 is threaded connected with the first threaded hole 271 after passing through the connecting through hole 31. The outer peripheral surface of the first connecting part 27 is also provided with a raised limit column 272, and the knob 3 is also provided with a limit column slot 32 for the insertion of the limit column 272 after assembly. The inner wall of the first opening 14 extends inward to form an arc groove 141, and the arc groove 141 is provided with a closed limit step 142 and an open limit step 143. After assembly, the limit column 272 is movably arranged in the arc groove 141. When the limit column 272 is against the closed limit step 142, the sealing block 4 is against the water outlet channel 12 to complete the sealing. When the limit column 272 is against the open limit step 143, the sealing block 4 is removed from the water outlet channel 12. The limit column 272 is not only used to prevent the relative rotation between the valve core 2 and the knob 3 after assembly, but also configured for positioning, so as to prevent the user from not knowing whether the sealing block 4 has been against the water outlet channel 12 when the angle valve is closed. When the limit column 272 butts against the closed limit step 142, the sealing block 4 butts against the water outlet channel 12 to complete the sealing, and the angle valve is in the closed state at this time. When the limit column 272 butts against the open limit step 143, the sealing block 4 is removed from the water outlet channel 12, so that water can enter into the accommodation cavity 13 from the water inlet channel 11 and flow into the water outlet channel 12 through the water flow channel 29, at this moment, the angle valve is in the open state. There is no need to position the switch of the angle valve with other parts, so as to reduce the number of parts, which is easy to manufacture and reduce cost.

As shown in FIG. 5-FIG. 6 and FIG. 12-FIG. 14, in this embodiment, the other end of the angle valve body 1 is provided with a second opening 15 communicated with the accommodation cavity 13, the angle valve body 1 is also provided with a sealing cover 7 for covering the second opening 15, and the peripheral surface of the angle valve body 1 located at one end where the second opening 15 is located is provided with a second sealing groove 16. A second sealing ring 8 is arranged in the second sealing groove 16. After assembly, one end of the second sealing ring 8 is against the bottom wall of the second sealing groove 16, and the other end of the second sealing ring 8 is against the inner wall of the sealing cover 7. The peripheral surface of the angle valve body 1 located at one end where the second opening 15 is located is also provided with an external thread 151, and the sealing cover 7 is provided with an internal thread 71 matched with the external thread 151. The sealing cover 7 is also provided with a flange 72 which is inserted into the second opening 15 after assembly, and an insertion cavity 73 is formed in the flange 72. One end of the second rotating part 26 away from the main body part 21 is also provided with a second connecting part 28 which is inserted into the insertion cavity 73 after assembly. The second opening 15 is arranged on the angle valve body 1 to facilitate the valve core 2 to be installed into the accommodation cavity 13 through the second opening 15, at the same time, it is convenient to set the first opening 14 during manufacturing and the step formed between the first opening 14 and the accommodation cavity 13 during injection molding for demoulding. After assembly, the second connecting part 28 is inserted into the insertion cavity 73, and the first connecting part 27 is inserted into the first opening 14, so that the valve core 2 is positioned axially at both ends of the valve core 2 at the same time, so that the axis of the valve core 2 coincides with the axis of the accommodation cavity 13 after assembly, so as to prevent the wear of the valve core 2 and the inner wall of the accommodation cavity 13 caused by the contact of the second rotating part 26 and the inner wall of the accommodation cavity 13 in the long-term use when the valve core 2 is positioned only at the first connecting part 27, which improves the service life of the parts and the user's experience.

As shown in FIG. 1-FIG. 14 and FIG. 19-FIG. 20, the angle valve body 1 is also provided with a water inlet joint 6 which is detachably connected with the angle valve body 1 through the joint piece 9. The water inlet joint 6 is provided with a joint insertion part 61 inserted into the water inlet channel 11 during assembly, and the joint insertion part 61 is provided with an insertion slot 62. The peripheral surface of the angle valve body 1 is provided with an insertion hole 18 communicated with the water inlet channel 11. The joint piece 9 is provided with snap arms 91, and a joint mounting cavity 92 with an opening at one end is formed between the two snap arms 91. The side wall of the snap arm 91 at one side where the joint mounting cavity 92 is located is provided with a raised insertion piece 93 which is matched with the insertion slot 62. The peripheral surface of the snap arm 91 away from the joint mounting cavity 92 is further provided with a snap block 94, the peripheral surface of the angle valve body 1 is further provided with a boss 17, and the boss 17 is provided with a snap arm insertion cavity 171 communicated with the insertion hole 18. During assembly, the snap arm 91 is inserted into the snap arm insertion cavity 171, The insertion piece 93 is inserted into the insertion slot 62 after passing through the insertion hole 18, and the snap block 94 is against one end surface of the boss 17. The outer peripheral surface of the snap arm 91 away from the joint mounting cavity 92 is further provided with a limit block 95, one end of the limit block 95 is provided with a snap arm limit step 951, and the other end of the limit block 95 is provided with a first sliding guide inclined surface 952 inclined towards the snap block 94. The insertion piece 93 is provided with an avoidance slot 931 located on the inner side of the snap arm 91 and corresponding to the snap block 94, so that when the joint piece 9 is inserted or pulled out, the section of the snap arm 91 located at the snap block 94 deforms and enters into the avoidance slot 931. One end of the joint piece 9 away from the limit block 95 is also provided with a handle 96, and one end of the insertion piece 93 toward the limit block 95 is provided with a second sliding guide inclined surface 932 inclined towards the handle 96. The joint piece 9 inserted on the outer circumference of the angle valve body 1 is connected with the water inlet joint 6, when connected, the snap block 94 butts against one end surface of the boss 17, so that the insertion piece 93 is inserted into the insertion slot 62, and the water inlet joint 6 and the angle valve body 1 remain sealed and connected. When disconnected, the handle 96 on the joint piece 9 is pull to deform a section of the snap arm 91 located on the snap block 94 to enter into the avoidance slot 931, so as to separate the snap block 94 from the boss 17. Thus, the insertion piece 93 is also separated from the insertion slot 62, and the water inlet joint 6 can be pull out from the angle valve body 1 to complete the disassembly. Using the snap block 94 to cooperate with the boss 17 to maintain the snap-fit connection, so that the angle valve structure has good overall use effect, strong durability and applicability, and has advantages in simple structure, convenient manufacture, low cost and good user experience performance.

Further, during assembly, the first sliding guide inclined surface 952 guides the sliding and drives the two snap arms 91 to move inward together, and the second sliding guide inclined surface 932 also has function as a sliding guide, so as to facilitate to insert the limit block 95 into the snap arm insertion cavity 171 and reduce the wear caused by movement, so as to improve the durability of the product, which will greatly improve the service life and facilitate assembly, and has a strong practicability. When the connection is disconnected, the snap arm limit step 951 butts against one end surface of the boss 17 to prevent the joint piece 9 from pulling out, so that it is not necessary to install the joint piece 9 again in the next connection, and also prevent the loss caused by the falling off of the joint piece 9.

As shown in FIGS. 1-14 and 19-20, in this embodiment, a joint sealing groove 63 is arranged on the peripheral surface of the water inlet joint 6, and a joint sealing ring 66 is arranged in the joint sealing groove 63. After assembly, one end of the joint sealing ring 66 is against the bottom wall of the joint sealing groove 63, and the other end of the joint sealing ring 66 is against the inner wall of the water inlet channel 11. A plurality of limit strips 19 are arranged on the inner wall of the water inlet channel 11, and the end surface of the joint insertion part 61 butts against the limit strip 19 after assembly. A locating ring 64 is formed on the outer peripheral surface of the water inlet joint 6, the insertion slot 62 is arranged between the locating ring 64 and the joint sealing groove 63. The diameter of the locating ring 64 is greater than the inner diameter of the water inlet channel 11, and the locating ring 64 butts against the outer end surface of the angle valve body 1 after assembly. A raised positioning insertion key 641 is arranged on the end surface of one end of the locating ring 64 facing the insertion slot 62, a positioning slot 111 matched with the positioning insertion key 641 is arranged on the angle valve body 1, and the positioning slot 111 is arranged on the end surface between the two bosses 17. The water inlet joint 6 is further provided with a joint connection part 65, and the locating ring 64 is arranged between the joint insertion part 61 and the joint connection part 65.

Further, after assembly, the joint sealing ring 66 abuts to the inner wall of the water inlet channel 11 and the outer peripheral surface of the joint sealing groove 63, so that the water inlet joint 6 is sealed and connected with the angle valve body 1 to prevent water or air leakage. The diameter of the locating ring 64 is larger than the inner diameter of the water inlet channel 11, so that the lower end of the locating ring 64 butts against the upper end of the angle valve body 1 after assembly, in this way, the insertion slot 62 is aligned with the insertion hole 18 to complete the positioning, such that the insertion piece 93 is conveniently inserted into the insertion slot 62 after passing through the insertion hole 18 to complete the snap-fit connection. The positioning insertion key 641 and the positioning slot 111 also play a role of positioning, and also limit the axial movement of the water inlet joint 6, providing a better sealing connection function. The outer peripheral surface of the joint connection part 65 is provided with a connection thread 651. The joint connection part 65 can be fixedly connected with a hose, a copper pipe, etc., which has advantages in simple structure and ingenious design, meeting a variety of use occasions and strong practicability.

What is claimed is:
1. An angle valve structure, comprising an angle valve body, wherein a water inlet channel and a water outlet channel are arranged in the angle valve body, an accommodation cavity respectively communicated with the water inlet channel and the water outlet channel is arranged between the water inlet channel and the water outlet channel, and a valve core is rotatably arranged in the accommodation cavity, a knob is fixedly connected to one end of the valve core exposed outside the accommodation cavity, the valve core is provided with a sealing block for sealing the water outlet channel; the valve core comprises a main body part and an elastic arm, wherein one end of the elastic arm is connected with the main body part, a first side of the main body part is provided with a mounting slot for placing the sealing block, a first side of the elastic arm is provided with an extrusion portion, and a second side of the elastic arm is provided with a contact portion extending into the mounting slot and butting against the sealing block after assembly; when the angle valve is closed, the extrusion portion butts against an inner wall of the accommodation cavity, wherein the contact portion butts the sealing block against the water outlet channel under an action of the inner wall of the accommodation cavity to complete sealing; when the angle valve is opened, the extrusion portion butts against the inner wall of the accommodation cavity, wherein the contact portion butts the sealing block against the inner wall of the accommodation cavity.

2. The angle valve structure according to claim 1, wherein an accommodation slot is arranged on a second side of the main body part, and an opening slot is arranged on a bottom wall of the mounting slot, wherein the accommodation slot is communicated with the mounting slot through the opening slot, one end of the elastic arm is fixedly connected with a bottom wall of the accommodation slot; the contact portion is inserted into the opening slot and butts against the sealing block after assembly.

3. The angle valve structure according to claim 2, wherein the extrusion portion is provided with a wear-resistant block, wherein after assembly, the extrusion portion butts against the inner wall of the accommodation cavity through the wear-resistant block.

4. The angle valve structure according to claim 3, wherein a first end of the main body part is provided with a first rotating part, and a second end of the main body part is provided with a second rotating part; a water flow channel for water flowing is provided between the first rotating part, the second rotating part, the main body part and the inner wall of the accommodation cavity after assembly.

5. The angle valve structure according to claim 4, wherein one end of the angle valve body is provided with a first opening communicated with the accommodation cavity, and one end of the first rotating part away from the main body part is provided with a first connecting part, the first connecting part is inserted into the first opening and partially exposed outside the angle valve body, and the knob is fixedly connected with the first connecting part in a circumferential direction.

6. The angle valve structure according to claim 5, wherein the first rotating part is provided with a first sealing groove, the first sealing groove is provided with a first sealing ring, a first end of the first sealing ring is against a bottom wall of the first sealing groove after assembly, and a second end of the first sealing ring is against the inner wall of the accommodation cavity.

7. The angle valve structure according to claim 6, wherein the knob is provided with a connecting through hole, the first connecting part is provided with a first threaded hole, the knob is fixedly connected with the first connecting part through a fixing screw, and the fixing screw is threaded with the first threaded hole after passing through the connecting through hole.

8. The angle valve structure according to claim 7, wherein a limit column is provided and raised from an outer peripheral surface of the first connecting part, an inner wall of the first opening extends inward to form an arc groove, and the arc groove is provided with a closed limit step and an open limit step; the limit column is movably arranged in the arc groove after assembly; when the limit column butts against the closed limit step, the sealing block butts against the water outlet channel to complete the sealing; when the limit column butts against the open limit step, the sealing block is moved away from the water outlet channel.

9. The angle valve structure according to claim 1, wherein the angle valve body is provided with a water inlet joint, the water inlet joint is detachably connected with the angle valve body through a joint piece, and the water inlet joint is provided with a joint insertion part inserted into the water inlet channel during assembly, the joint insertion part is provided with an insertion slot; a peripheral surface of the angle valve body is provided with an insertion hole communicated with the water inlet channel, the joint piece is provided with a snap arm, and a joint mounting cavity with an opening at one end is formed between the two snap arms; a side wall of the snap arm located towards the joint mounting cavity is provided with an insertion piece raised from the side wall and the insertion piece is matched with the insertion slot; a peripheral surface of the snap arm away from the joint mounting cavity is provided with a snap block, and the peripheral surface of the angle valve body is provided with a boss; a snap arm insertion cavity communicated with the insertion hole is arranged in the boss; the snap arm is inserted into the snap arm insertion cavity during assembly, the insertion piece is inserted into the insertion slot after passing through the insertion hole, and the snap block is against one end surface of the boss.

10. The angle valve structure according to claim 9, wherein a limit block is arranged on the peripheral surface of the snap arm away from the joint mounting cavity, a first end of the limit block is provided with a snap arm limit step, and a second end of the limit block is provided with a first sliding guide inclined surface inclined towards a direction of the snap block.

11. The angle valve structure according to claim 10, wherein the insertion piece is provided with an avoidance slot located on an inner side of the snap arm and corresponding to the snap block, wherein when the joint piece is inserted or pulled out, a section of the snap arm at the snap block is deformed and enters the avoidance slot.

12. The angle valve structure according to claim 11, wherein one end of the insertion piece towards the limit block is provided with a second sliding guide inclined surface inclined in a direction away from the limit block.

13. The angle valve structure according to claim 12, wherein a joint sealing groove is arranged on an outer peripheral surface of the water inlet joint, a joint sealing ring is arranged in the joint sealing groove, a first end of the joint sealing ring butts against a bottom wall of the joint sealing groove after assembly, and a second end of the joint sealing ring is against an inner wall of the water inlet channel.

14. The angle valve structure according to claim 13, wherein a locating ring is formed on the outer peripheral surface of the water inlet joint, and a raised positioning insertion key is arranged on an end surface of one end of the locating ring towards the insertion slot, the angle valve body is provided with a positioning slot matched with the positioning insertion key, and the positioning slot is arranged on an end surface between the two bosses.

15. The angle valve structure according to claim 14, wherein the water inlet joint is provided with a joint connection part, and the locating ring is arranged between the joint insertion part and the joint connection part.

* * * * *